BINARY DIVIDER
Filed April 6, 1962
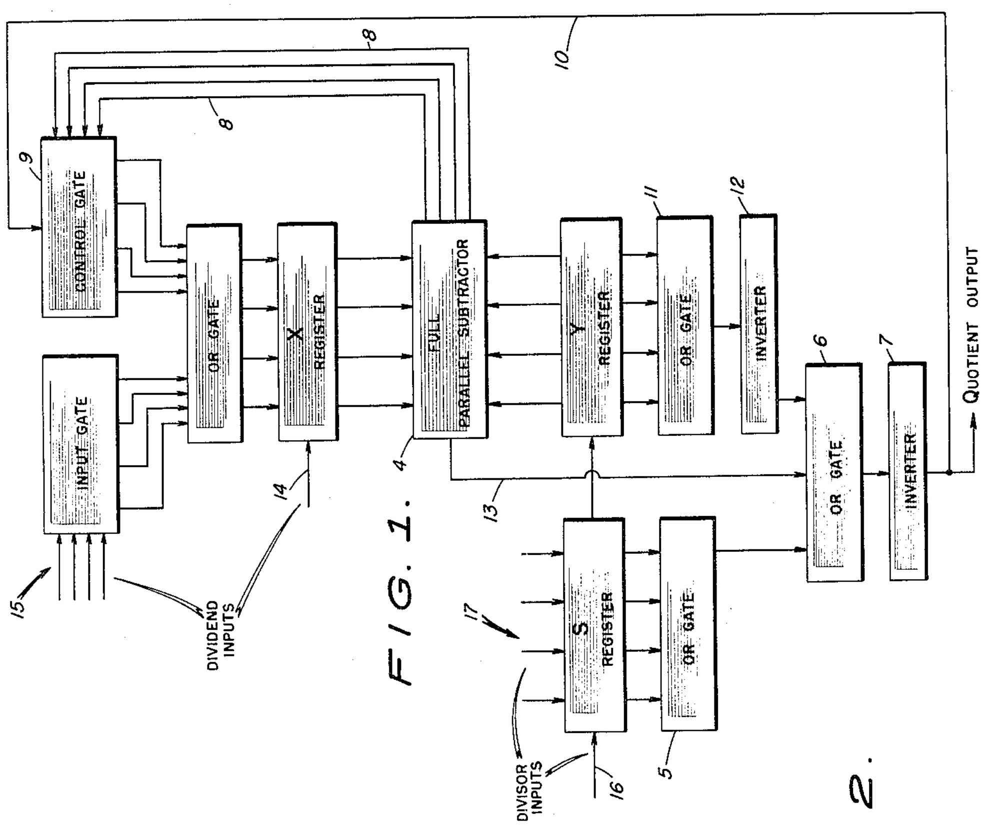
FIG. 1.
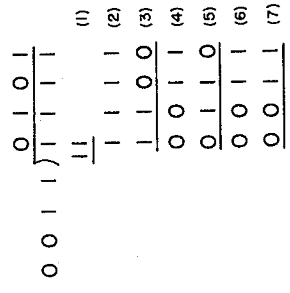
FIG. 2.
| SHIFT PULSE | X | S | Y | DIFF (X-Y) | Q |
|---|---|---|---|---|---|
| 1 | 1111 | 1000 | 0000 | — | x0000 |
| 2 | 1111 | 1100 | 0000 | — | x0000 |
| 3 | 1111 | 0110 | 0000 | — | x0000 |
| 4 | 1111 | 0011 | 0000 | — | x0000 |
| 5 | 1111 | 0001 | 1000 | — | x0000 |
| 6 | 1111 | 0000 | 1100 | 0011 | x1000 |
| 7 | 0011 | 0000 | 0110 | — | x0100 |
| 8 | 0011 | 0000 | 0011 | 0000 | x1010 |
X= BINARY POINT
FIG. 3.
HARRY D. ZINK, Jr.
INVENTOR
BY Q. Baxter Warner
Claude Funkhouser
ATTORNEYS

United States Patent Office 3,229,079

Patented Jan. 11, 1966

3,229,079

BINARY DIVIDER

Harry D. Zink, Jr., Silver Spring, Md., assignor to the United States of America as represented by the Secretary of the Navy Filed Apr. 6, 1962, Ser. No. 185,769
2 Claims. (Cl. 235—164)

This invention relates in general to computers and more specifically to a circuit for performing binary division.

In a general purpose digital computer the usual practice is to build one relatively complicated single arithmetic element and program the inputs and outputs of this element to perform the various operations of addition, subtraction, multiplication, division, square rooting, etc. In most cases the arithmetic element consists of a single accumulator of great versatility together with its peripheral equipment.

Because of this arrangement not all of the above operations can be performed directly and some must be performed using approximation formulae that require only indirect operations for their solution. Such is the case with division; and most computer literature that discusses division usually gives an iterative formula that is solved using only multiplications and additions. Several cycles of operation are required before the correct answer is reached and therefore considerable internal programming is necessary for the operation to be performed.

Designs for serial and parallel adders, subtractors, and multipliers which perform their functions directly can be found in the prior art. However, heretofore a binary divider circuit which could be operated in a similar direct manner was not available. The invention solves this problem by providing a circuit which divides without iterative techniques and without unduly slowing down the computation process.

It is therefore an object of the present invention to provide a circuit for producing direct binary division.

Another object of the invention is to provide a direct binary divider which is simple, compact, and accurate.

Still another object of the invention is to provide a direct binary divider into which information may be inserted in serial or parallel.

A further object of the invention is to provide a binary divider which divides without the use of iterative techniques.

Other objects and many of the attendant benefits of this invention will be readily appreciated as the same becomes better understood by reference to the following detailed description when considered in connection with the accompanying drawings, in which:

FIG. 1 is a schematic diagram of the circuit which comprises the invention;

FIG. 2 is an illustration of manual binary division; and

FIG. 3 is a chart noting the positions of the bits in the various registers for every shift pulse during a sample problem.

Binary division is performed by successively subtracting the divisor from the dividend and placing a ONE in the quotient each time substraction is possible and a ZERO in the quotient each time subtraction is impossible. In this process all ZEROs in the divisor to the left of the most significant ONE are neglected.

The first step of the process is proper registration of the most significant ONE of the divisor under the most significant ONE of the dividend. The technical name for this process is called "left justifying." The next step is to compare the divisor bit by bit with the dividend to determine if the divisor will go into the part of the dividend considered and therefore, whether the quotient should be a ONE or a ZERO. If the quotient is a ONE, then the divisor is subtracted from the dividend and the remainder is inserted in the dividend in place of the previous bits considered. The divisor is then shifted right one position and the comparison process is repeated. If the quotient is a ZERO, the dividend is retained and the divisor is shifted right one position.

A circuit which performs binary division must necessarily perform each step of this process. One of the first requirements is a means of eliminating unnecessary ZEROs in the divisor and properly registering the dividend and divisor for each subtraction step. An equally important requirement is a means for properly generating ONEs and ZEROs in the quotient according to the division process. A third requirement is a means for inserting the remainder into the dividend whenever a ONE is registered in the quotient. A fourth requirement is a means for rendering the quotient ZERO whenever the dividend contains all ZEROs. The invention provides a circuit which performs all of these necessary functions.

A block diagram of the direct binary divider as shown in FIG. 1 is drawn to give the concept of operation. The diagram indicates somewhat more complexity than actually exists because the logic blocks are shown separately to clarify the operation. However, they can all actually be combined into one relatively simple logic network.

Looking more closely to FIG. 1, the circuit embodying the invention may conveniently be divided into four sections for purposes of explanation. The X register and its associated gates receive the dividend and apply it to the subtractor 4. The S register receives the divisor and applies it bit by bit in serial fashion to the Y register which in turn applies it to the subtractor 4. The S register provides the divisor to the Y register in proper sequence to achieve registration between the dividend and the divisor in the subtractor 4.

One of the requirements of the circuit is proper initial registration of the dividend and the divisor. All ZEROs to the left of the most significant bit in the divisor must be eliminated from consideration. This function is preformed by the S register and its associated OR gate 5. The divisor is inserted into the S register either serially or in parallel and is shifted into the Y register bit by bit. The divisor appears in the S register with the least significant bit occupying the right-most position. This bit will then be the first to enter the Y register. As long as a ONE appears in the S register the OR gate 5 will be activated, thereby activating the output OR gate 6. The pulse from output gate 6 is applied to inverter 7, thereby providing the quotient output with a ZERO. Thus the division process will not start until the most significant bit in the divisor enters the Y register.

The S register is provided as a means for initial implicit left justifying the divisor and the dividend by preventing a quotient output from appearing until the most significant ONEs are correctly lined up. Sensing logic is so arranged that the state of each flip-flop of the S register is monitored and if there is a ONE present in any of these stages, the load gates are not permitted to enter the subtraction result into the X register and the quotient output is kept at ZERO. The S register automatically prevents the division process from starting until all the ONEs have left the S register and entered the Y register. In this way the ZEROs to the left of the most significant ONE in the divisor are removed from the computation process because as far as the S register is concerned the division process can start as soon as the most significant ONE enters the Y register.

The subtraction of the divisor from the portion of the dividend under consideration at any given time is carried on by the full parallel subtractor 4. The remainder is then applied via lines 8 to the control gate 9 which in turn inserts this result into the X register as the new dividend as is required by the division process.

As was noted previously this insertion of the remainder into the dividend should occur only when the quotient receives a ONE. As a result the quotient output is used to control the operation of gate 9 via line 10. If the quotient output is ZERO, control gate 9 will remain closed and the output of subtractor 4 will be inhibited from entering the X register.

The inhibit function is necessary because the subtractor 4 is a fully parallel, instantaneous logic device so that some answer is always present on its output lines. This answer is the difference between the quantity in the X register and that in the Y register. As these registers may not always be fully loaded or the bits may not always be shifted into the correct positions, a means must be provided for inhibiting the use of the subtractor output until the conditions are such that the result of the subtraction is actually useable.

Operation of control gate 9 is controlled as described above by the sensing logic connected to the S register and also by sensing logic connected to the Y register and a borrow bit line from the subtractor 4. The logic connected to the Y register comprises an OR gate 11 and an inverter 12 which activate gate 6 and inverter 7 whenever the Y register contains all ZEROs. This circuit thus prevents division by zero.

The borrow bit line 13 connected to the most significant bit circuit in the subtractor aids in proper registration of the divisor. If the most significant bit in the remainder is a ONE it indicates that the quantity in the Y register is larger than that in the X register and so subtraction is not possible. In such a case the output from the subtractor 4 must be inhibited at the control gate 9.

Depending on the manner in which the divider must be used in relation to other computing elements, the dividend may have to be entered either in serial or parallel form into the X register via inputs 14 and 15, respectively. The detail design of the loading circuit will of course differ depending upon the overall system instrumentation within which division is to be performed. If the serial form of entry is required, the X register must be of the serial-parallel form because the remainder from the parallel subtractor 2 must be entered into this same register in parallel form when the division process is under way.

The divisor is first loaded into the S register and then serially shifted into the Y register. Since the binary divisor may be presented in either serial or parallel form dependent upon system considerations, the S register must be capable of accepting binary data in serial or parallel form via inputs 16 or 17, respectively. The Y register need only have serial input since the divisor is always shifted serial from the S register to the Y register after the initial loading. It is therefore apparent that the ideal arrangement for maximum circuit simplicity is for the X register to be loaded in parallel and for the S register to be loaded in serial if this can be made compatible with other system considerations.

In summary, the following rules govern the operation of the divider regardless of the binary configurations of either the X, Y or S registers.

(1) The logic circuits generate a quotient output of ZERO if there is a ONE present in the S register or if there is a ONE output from the most significant unit of the parallel subtractor or if the Y register is completely filled with ZEROs.

(2) The logic circuits generate a ONE output for the quotient if there are no ONEs in the S register and the most significant digit in the subtractor 4 is ZERO and the Y register contains at least a single ONE.

(3) If for a particular shift pulse interval the quotient output is ZERO, the output from the parallel subtractor is inhibited from entering the X register and this register retains the number it has. The number in the Y register is then shifted one place to the right and the logic comparisons are repeated.

(4) If for a particular shift pulse interval the quotient is ONE, the output from the parallel subtractor is entered into the X register and replaces the previous number. As this is done, the number in the Y register is shifted one place to the right and the logic comparisons are repeated.

The operation of the invention can be best illustrated by following through an example and noting the positions of the bits in the various registers for every shift pulse. FIG. 2 shows the manual division of 15 by 3 using binary numbers. It is first noted that the two ZEROs in the left half of the divisor are eliminated. In line (1) the divisor is matched to the first digit of the dividend. Subtraction is not possible so a ZERO is placed in the quotient and the dividend is retained in line (2). In line (3) the divisor is shifted to the right one digit. This time subtraction is possible so a ONE is placed in the quotient and the remainder is inserted into the dividend in place of the previous numbers considered. The new dividend is shown in line (4). In line (5) the divisor is again shifted to the right one digit. Subtraction is not possible and so a ZERO is placed in the quotient and the dividend is retained without change in line (6). In line (7) the divisor is again shifted to the right one digit. Subtraction is again possible so a ONE is placed in the quotient. The dividend is now all ZEROs so division is complete.

FIG. 3 contains a table showing the positions of the bits in the various registers for every shift pulse. The first shift pulse will load 1111 into the X register and because the least significant bit arrives first on the serial line 16 to the S register it will also load a ONE into the S register. It should be noted at this time that the bits in the quotient output are in reverse order from the registers with the least significant bit being in the extreme left position.

It is noted that there is no output from the subtractor for the first five shift pulses. For the first four shift pulses the Y register contains all ZEROs and for the first five shift pulses the S register contains one or more ONEs. Either condition will inhibit any change to the dividend. On shift pulse number 6 a ONE appears in the quotient and so the output of the subtractor is inserted into the X register in place of the previous dividend. On shift pulse number 7 the inhibit function is performed via line 13 and OR gate 6. In subtracting Y from X during this pulse the most significant bit of the result will be a ONE. This will inhibit any change in the dividend in a manner already explained.

At the eight shift pulse the computation of the integer part of the answer is completed, however, the division may be continued if more shift pulses are supplied; then any binary fractional part of the quotient may be calculated to at least a few places. The placing of the binary point in relation to the quotient output will depend on how many shift pulses are employed. If only eight are used the binary point is at the extreme left of the quotient output and because the answer is generated with the most significant bit first, the answer calculated in the above example is actually $0101_x$. If nine shift pulses are used the binary point is moved one place to the right, if ten—two places, etc. If the binary points are placed at any location in the X and Y registers other than the extreme right then the above rule will not apply and the new location of the binary point must be found by examination. In any case once the location of the point is determined and the number of shift pulses is fixed its location in the quotient output will remain fixed for all computations involving the selected binary point locations in the X and Y registers.

Obviously, many modifications and variations of the present invention are possible in the light of the above teachings. It is therefore to be understood that within the scope of the appended claims the invention may be practiced otherwise than as specifically described.

What is claimed is:

1. A direct binary divider adapted to be operated during a succession of digital time intervals to produce a binary quotient comprising first and second registers for storing operands, a group of binary digits in said first register representing a dividend, a storage means containing a group of binary digits representing a divisor connected to said second register for applying these digits bit by bit to said second register, a full parallel subtractor connected directly to both of said registers for continuously comparing the divisor with the dividend, a feedback circuit connected between said subtractor and said first register for replacing the digits in said first register with the output of said subtractor, a control gate connected in said feedback circuit, first gating means connected to said second register and said control gate for rendering said control gate inoperative when said second register contains only zero digits, second gating means connected to said storage means and said control gate for rendering said control gate inoperative as long as said storage means contains a non-zero digit, third gating means connected to said subtractor and said control gate for rendering said control gate inoperative whenever the most significant digit in said subtractor is a non-zero digit, and output means for providing a binary representation of said quotient as manifested by the operation of said control gate during said digital time intervals.

2. A direct binary divider comprising first and second registers for storing operands, a group of binary digits in said first register representing a dividend, a storage register containing a group of digits representing a divisor connected to said second register for applying these digits bit by bit to said second register, a full parallel subtractor connected directly to said first and second registers for continuously comparing the divisor with the dividend, a feedback circuit connected between the output of said subtractor and said first register for replacing the digits in said first register with the output of said subtractor, a control gate connected in said feedback circuit, an output gate including an inverter connected to said control gate for controlling the operation of said control gate, a first gate including an inverter connected to said second register and said output gate for preventing division by zero, a second gate connected to said storage register and said output gate for timing initial operation of the divider, and means connecting said subtractor to said output gate for permitting operation of said control gate only when arithmetical subtraction is possible.

References Cited by the Examiner

UNITED STATES PATENTS

| | | | |
|---|---|---|---|
| 2,623,171 | 12/1952 | Woods-Hill et al. | 235—159 X |
| 3,023,961 | 3/1962 | Stafford | 235—164 |
| 3,028,086 | 4/1962 | Sierra | 235—160 |
| 3,078,040 | 2/1963 | Rowe et al. | 235—164 |

ROBERT C. BAILEY, *Primary Examiner.*

DARYL W. COOK, *Examiner.*

E. RONEY, I. S. KAVRUKOV, *Assistant Examiners.*